United States Patent [19]

Brown

[11] Patent Number: 4,633,609
[45] Date of Patent: Jan. 6, 1987

[54] KNOTLESS FISHLINE CONNECTOR

[76] Inventor: Ian A. Brown, 44 Tanglewood Dr., Lake Oswego, Oreg. 97034

[21] Appl. No.: 688,713

[22] Filed: Jan. 4, 1985

[51] Int. Cl.⁴ .............................................. A01K 91/04
[52] U.S. Cl. ..................................... 43/43.1; 43/42.31
[58] Field of Search ................... 43/43.1, 43.14, 42.31, 43/42.36, 42.49; 24/115 M, 131 C, 136 L

[56] References Cited

U.S. PATENT DOCUMENTS

| 670,328 | 3/1901 | Rigby ................................. 43/43.1 |
| 2,348,608 | 5/1944 | Cleverly . |
| 2,890,510 | 6/1959 | Spalding . |
| 3,140,520 | 7/1964 | Marino et al. . |
| 3,670,447 | 6/1972 | Wohead ............................ 43/43.14 |
| 3,765,118 | 10/1973 | Reitler . |
| 3,939,594 | 2/1976 | Wagner . |
| 3,960,461 | 6/1976 | Sachs ............................... 24/115 M |
| 4,031,652 | 6/1977 | Johnson . |

4,177,598 12/1979 Jolley .

Primary Examiner—Nicholas P. Godici
Assistant Examiner—G. M. Reid

[57] ABSTRACT

A body member is tapered to a smaller dimension from one end to the other and is arranged to receive a sleeve member in wedging relation. A bore extends into one end of the body member for receiving a line and this bore exits radially of the body member at a point between the ends. A tag end of the line which projects from the radial bore is arranged to be pinched between the two members for providing a positive anchored connection. In addition, transverse bores are provided in the body member for additional threading of the line to provide extra line portions pinched between the two members. The device is particularly useful with a sinker assembly employing removable lead shot for varying the weight of the sinker assembly.

2 Claims, 3 Drawing Figures

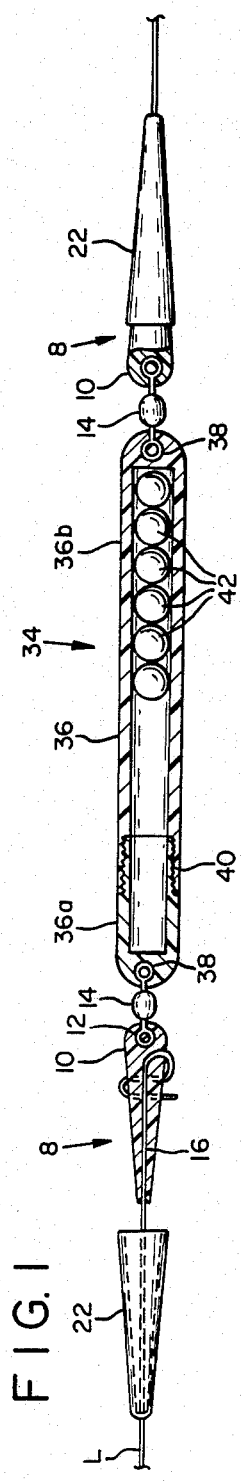
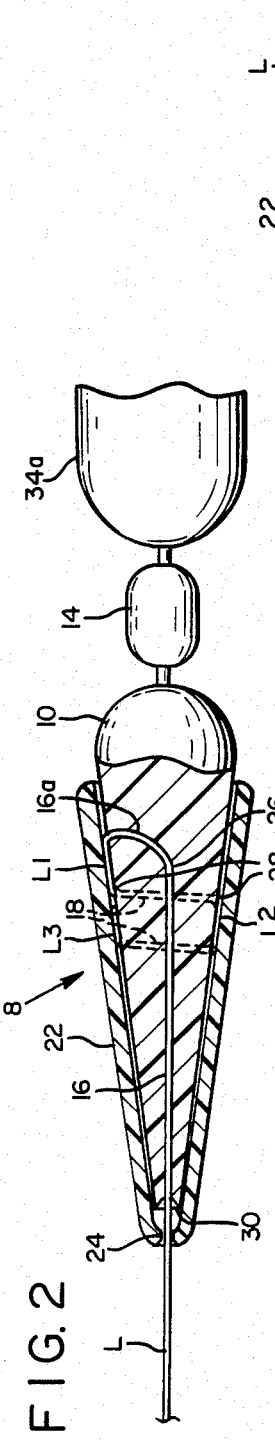
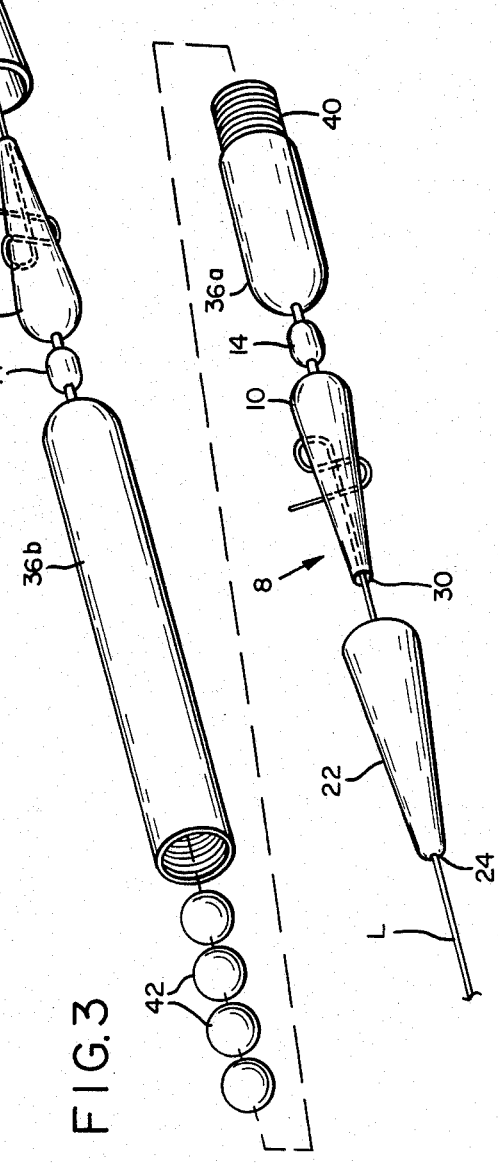
FIG. 1
FIG. 2
FIG. 3

KNOTLESS FISHLINE CONNECTOR

BACKGROUND OF THE INVENTION

This invention relates generally to fishline connectors and is more particularly concerned with a connector for the purpose of connecting a fishline or leader to other gear without the necessity of tying a knot.

Prior devices have been devised for connecting fishlines to a leader, weight means, etc. It is, however, the purpose of the present invention to provide an improved connector which is inexpensive to manufacture, easy to use, and positive in providing the connection to a fishline.

SUMMARY OF THE INVENTION

The objectives of the invention are accomplished by the use of a tapered body member having a longitudinal bore leading inwardly from one end and exiting in a radial extension opening exteriorly at a point between the two ends. The bore is arranged to receive a line passed endwise through it and out the radial portion with an end of the line projecting exteriorly. A sleeve member is employed with the body member and has a central tapered interior dimensioned and arranged to fit on and have wedging engagement with the body member whereby to pinch the projecting end of the line against the body member to form a hold on the line. The body member may also employ one or more transverse bores for threading the projecting end of the line back and forth and thus providing a more positive hold. The invention is particularly adaptable for use in combination with a sinker assembly having a hollow tubular housing capable of being opened for the purpose of inserting variable amounts of lead shot.

The invention will be better understood and additional objects will become apparent from the following description taken in connection with the accompanying drawing.

BRIEF DESCRIPTION OF THE DRAWINGS

FIG. 1 is a longitudinal sectional view of a connector of the invention and its combination with a sinker assembly;

FIG. 2 is an enlarged elevational view, partly broken away, of the connector; and FIG. 3 is a composite exploded view of the connector and sinker assembly.

DETAILED DESCRIPTION OF A PREFERRED EMBODIMENT

With particular reference to the drawings, a connector 8 of the invention comprises a tapered body member 10 smooth surface. The large end of this member has a molded or other suitable type of connection 12 to a swivel 14 for attachment to other fishing gear, as will be described hereinafter. The body member 10 has a bore 16 extending longitudinally thereinto from its small end and exiting out the side of the body member by a radial bore extension 16a. Body member 10 also has one or more transverse bores 18. These latter bores bypass the bore 16 in non-intersecting relation.

A fishline L to be attached to the connector is inserted endwise into the bore 16 at the small end of the body member and out the radial bore extension 16a. A tag end of this line is arranged for anchored attachment to the body member by means of a hollow conical sleeve member 22 dimensioned and arranged to have wedging engagement on the body member. The end of the fishline to be connected extends through an aperture 24 at the small end of the sleeve and out the radial extension 16a, and with a tag end of the line projecting from the extension 16a, the pinched engagement thereof between the members 10 and 22 holds it firmly anchored to the member 10.

With reference to FIG. 2, if the line is not threaded through one or both of the bores 18, a portion thereof, designated by reference character L1, will be pinched between the two members. If the line is threaded through an adjacent bore 18, portions L1 and L2 will be pinched. If the line is fully threaded through both bores 18, portions L1, L2, and L3 will be pinched. Although a single connection L1 will provide a satisfactory anchor for the line, an assurance of a positive connection can be increased by threading the line through one or both of the bores 18.

Bore extension 16a is rounded and the juncture 26 thereof with the longitudinal bore 16 is also rounded so that there will be no sharp edge at this point. Likewise, all other bore openings have rounded edges 28 to prevent cutting of the line. Also, the inlet end of bore 16 in the body member 10 has a tapered opening 30 for easily threading the end of the line into this bore. Aperture 24 is tapered for this same purpose.

The connector is adaptable for use with various types of fishing gear and is particularly useful at the opposite ends of a sinker assembly 34. In a particular application, the sinker assembly 34 comprises a tubular housing 36 having closed ends to which connections 38, such as molded connections, can be made to the swivels 14. In a preferred arrangement, the housing 36 is elongated and is formed in two connectable parts 36a and 36b, these parts having a threaded connection 40 with each other. Lead shot 42 is loaded into the housing 36 as desired to control the weight of the sinker.

According to the invention, the connector 8 is simplified in construction, utilizing only the two parts. With the sleeve member 22 wedged in place on the body member 10, a good connection is provided between the line and the body member. With the line threaded an extra amount through the bores 18 a more positive connection can be provided. Use of the bores 18, for example, may be desirable on very small lines or leaders.

The device is readily installed and removed. For the purpose of installing a line therein, it is merely passed through the tapered openings 24 and 30. This can be accomplished readily even with gloves on or with cold hands, and such comprises an improvement over other types of connectors which require precise installation of line in slots or wrappings.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:
1. In combination,
   a connector device having a body member with opposite ends,
   one end of said body member having a connector portion for connection to other means to which attachment is to be made, the said body member having a smooth exterior surface tapered to a smaller dimension from said one end to the other end, a longitudinal bore interiorly of said body member having a portion thereof leading inwardly from said other end and having a radial extension exiting through the surface of said body member at a point between said ends, a full width transverse bore in said body member spaced from the exit point of said radial extension;

a fish line extending endwise into said bore at said other end of the body member and out said radial extension with an end thereof projecting exteriorly of said body member and lying along said smooth surface and extending into said transverse bore;

and a sleeve member having a central tapered opening therethrough dimensioned and arranged to have wedging engagement on said body member whereby to pinch said line which extends between the exit point of said radial extension of said longitudinal bore and said transverse bore and which lies against the surface of said body member, whereby to form a knotless connection between the body member and the line.

2. The connector of claim 1 including a second full width transverse bore in said body member, said second bore being spaced from said first mentioned transverse bore and receiving said line from said first mentioned transverse bore in threading back and forth relation whereby to provide another line portion which lies on the surface of said body member for pinching engagement by said sleeve member, said transverse bores being offset from said longitudinal bore at its radial extension whereby to be in non-intersecting relation therewith.

* * * * *